(12) United States Patent
Beller

(10) Patent No.: US 9,203,540 B2
(45) Date of Patent: Dec. 1, 2015

(54) METHOD AND APPARATUS FOR AUTOMATIC DISCOVERY IN OPTICAL TRANSPORT NETWORKS

(75) Inventor: Dieter Beller, Korntal (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/394,897

(22) PCT Filed: Aug. 13, 2010

(86) PCT No.: PCT/EP2010/061853
§ 371 (c)(1),
(2), (4) Date: Mar. 8, 2012

(87) PCT Pub. No.: WO2011/029695
PCT Pub. Date: Mar. 17, 2011

(65) Prior Publication Data
US 2012/0177364 A1 Jul. 12, 2012

(30) Foreign Application Priority Data
Sep. 14, 2009 (EP) ..................................... 09305838

(51) Int. Cl.
*H04L 12/26* (2006.01)
*H04J 3/14* (2006.01)
(Continued)

(52) U.S. Cl.
CPC ................. *H04J 3/14* (2013.01); *H04J 3/1652* (2013.01); *H04L 41/12* (2013.01); *H04Q 11/0062* (2013.01); *H04Q 2011/0079* (2013.01)

(58) Field of Classification Search
CPC .................................. H04J 3/14; H04J 3/1652
USPC ...................... 370/252, 242; 398/16, 25, 135; 709/221, 224, 233
See application file for complete search history.

(56) References Cited

U.S. PATENT DOCUMENTS 7,333,425 B2 * 2/2008 Huck et al. .................... 370/217
7,590,131 B2 * 9/2009 Ansorge et al. ............... 370/409

(Continued)

FOREIGN PATENT DOCUMENTS

EP 1372288 12/2003
EP 1916799 4/2008

(Continued)

OTHER PUBLICATIONS

Telecommunication Standardization Sector of ITU-T; Protocol for automatic discovery in SDH and OTN Networks, G.7714.1/Y.1705.1 (Apr. 2003); Series G: Transmission Systems and Media, Digital Systems and Networks, Digital terminal equipments—Operations, administration and maintenance features of transmission equipment, Series Y: Global Information Infrastructure and Internet Protocol Aspects, Internet protocol aspects—Operation, administration and maintenance; Apr. 22, 2003; pp. 1-32; XP017434550.

(Continued)

*Primary Examiner* — Rasheed Gidado
(74) *Attorney, Agent, or Firm* — Patti & Malvone Law Group, LLC

(57) ABSTRACT

In order to improve the link adjacency discovery in an Optical Transport Network, a method and related network nodes are provided. A first network node (21) has a first discovery agent (216) and a second network node (22) has a second discovery agent (226). A discovery message (210) is transmitted from a first interface of the first network node (21) over one or more subsequent network links (25, 26, 27) to a second interface of the second network node (22). The discovery message (210) contains information indicative of a discovery agent identifier associated with the first discovery agent (216) and of a termination connection point identifier associated with the first interface. In order to transmit the discovery message (210), the first interface is configured to perform a tandem connection source function (217) using a reserved field in an overhead portion of signal frames to be transmitted. The second interface is configured to perform a Tandem Connection Monitoring function (227) on the same reserved field of received signal frames. The discovery message is sent using a Trail Trace Identifier (TT!) byte available in the reserved field.

19 Claims, 4 Drawing Sheets

(51) Int. Cl.
*H04J 3/16* (2006.01)
*H04L 12/24* (2006.01)
*H04Q 11/00* (2006.01)

(56) References Cited

U.S. PATENT DOCUMENTS

| | | | | |
|---|---|---|---|---|
| 7,633,952 | B2* | 12/2009 | Ong et al. | 370/400 |
| 7,983,182 | B2* | 7/2011 | Sadler et al. | 370/252 |
| 2002/0191241 | A1* | 12/2002 | Emery et al. | 359/109 |
| 2004/0062277 | A1* | 4/2004 | Flavin et al. | 370/474 |
| 2007/0115854 | A1* | 5/2007 | Bunse | 370/252 |
| 2007/0189336 | A1* | 8/2007 | Zou | 370/505 |
| 2008/0212961 | A1* | 9/2008 | Zhang | 398/25 |

FOREIGN PATENT DOCUMENTS

| | | |
|---|---|---|
| EP | 2075955 | 7/2009 |
| JP | 2003188919 | 7/2003 |
| JP | 2005507575 | 3/2005 |
| JP | 2007096499 | 4/2007 |
| JP | 2008545334 | 12/2008 |

OTHER PUBLICATIONS

Telecommunication Standardization Sector of ITU-T; Interfaces for the Optical Transport Network (OTN); G.709/Y.1331 (Mar. 2003), Series G: Transmission Systems and Media, Digital Systems and Networks Digital terminal equipments—General, Series Y: Global Information Infrastructure, Internet Protocol Aspects and Next Generation Networks, Internet protocol aspects—Transport; Mar. 16, 2003; XP017400848.

International Telecommunication Union; ITU-T; G.7714.1/Y1705.1, Amendment 1, (Feb. 2006); Protocol for automatic discovery in SDH and OTN Networks; Amendment 1: New Appendix VI—Usage of the Different Discovery Mechanisms; Feb. 2006.

International Telecommunication Union; ITU-T; G.872 (Nov. 2001); Architecture of Optical Transport Networks; Series G: Transmission Systems and Media, Digital Systems and Networks; Digital Networks—Optical Transport Networks.

* cited by examiner

US 9,203,540 B2

METHOD AND APPARATUS FOR AUTOMATIC DISCOVERY IN OPTICAL TRANSPORT NETWORKS

FIELD OF THE INVENTION

The present invention relates to the field of telecommunications and more particularly to a method and related apparatus for automatic discovery in an optical transport network.

BACKGROUND OF THE INVENTION

The Optical Transport Network (OTN) is a network technology for the transport of optical data signals at very high rates (2, 5, 10, and 40 Gbit/s). OTN relies on time division multiplexing of constant rate transport signals to even higher rate transport signals and supports wavelength division multiplexing, as well. Signal structures and interfaces of the Optical Transport Network have been defined in ITU-T G.709 (03/2003), which is incorporated by reference herein.

Control plane technologies based on the GMPLS protocol family have been introduced to allow automated path setup through the network. Traditionally, creating traffic paths through a series of network elements has involved configuration of individual cross-connections on each network element. In an Automatic Switched (Optical) Transport Network (ASTN or ASON), just the start point, end point and bandwidth required needs to be specified through the user, and the control plane of the network will automatically allocate the path through the network, provision the traffic path, set up cross-connections, and allocate bandwidth from the paths for a client signal.

In order to support such automatic path creation through control plane signaling, a protocol for automatic discovery of layer adjacencies in the transport plane has been defined in ITU-T G.7714.1(04/2003), which is incorporated by reference herein. Layer Adjacency Discovery (LAD) describes the process of discovering the link connection end-point relationships and verifying their connectivity. The term "discovery" is used in this context to refer to both "discovery" and verification. G.7714.1 defines two alternative methods: one using a test set in the client layer, the other using in-band overhead in the server layer.

In particular, G.7714.1 defines under its chapter 6 the following mechanisms as applicable to the OTN layer networks:
  OTUk layer: Within the OTUk layer the SM section monitoring byte and the GCC0 may be used to support discovery of the OTUk adjacency. Specifically, the SAPI subfield within the SM is used to carry the discovery message.
  ODUk layer: Within the ODUk layer the PM path monitoring byte and the GCC1 and GCC2 bytes may be used to support discovery of the ODUk adjacency. Specifically, the SAPI subfield within the PM is used to carry the discovery message.

The present invention aims at improving this automatic discovery mechanism.

SUMMARY OF THE INVENTION

The inventor has discovered two main problems, which arise with the layer adjacency discovery as defined in G.7714.1: the first method defined there uses the an overhead field, in particular the section monitoring byte, which is also termed Trail Trace Identifier (TTI), in the overhead of the transport frames at the server layer, which are termed Optical Transport Units (OTUs). A problem exists when the connection between two optical cross-connects, which have to communicate in the discovery process with each other, leads over a WDM span and the OTU overhead is terminated at intermediate WDM equipment. In this case, two optical cross-connects cannot use the OTU layer for LAD. Alternatively in accordance with G7714.1, the layer adjacency discovery can use the TTI field in the overhead of a higher multiplexing layer, i.e. an Optical Data Unit-k (ODUk) transported as client layer signal within the server layer OTU frames. This however requires the presence of an ODUk trail termination function, which is not always available. Hence, the applicability of trail-trace-based link adjacency discovery in the OTN is limited.

The inventor proposes a solution to this problem that utilizes a Tandem Connection Monitoring (TCM) sublayer for auto-discovery.

In particular, a method and related network nodes are provided for performing automatic Layer Adjacency Discovery in an Optical Transport Network. A first network node has a first discovery agent and a second network node has a second discovery agent. A discovery message is transmitted from a first interface of the first network node over one or more subsequent network links to a second interface of the second network node. The discovery message contains information indicative of an discovery agent identifier associated with the first discovery agent and of a termination connection point identifier associated with the first interface. In order to transmit the discovery message, the first interface is configured to perform a tandem connection source function using a reserved field in an overhead portion of signal frames to be transmitted. The second interface is configured to perform a Tandem Connection Monitoring function on the same reserved field of received signal frames. The discovery message is sent using a Trail Trace Identifier byte available in the reserved field.

BRIEF DESCRIPTION OF THE DRAWINGS

Preferred embodiments of the present invention will now be described with reference to the accompanying drawings in which.

DETAILED DESCRIPTION OF THE INVENTION

In SONET/SDH networks, regenerators have mostly disappeared, which means that SONET/SDH cross-connects are directly interconnected without regenerators terminating the Regenerator Section Overhead (RS-OH). Based on this, it is possible to utilize the in-service J0 section trace-based LAD as defined in G.7714.1.

Figure 1:
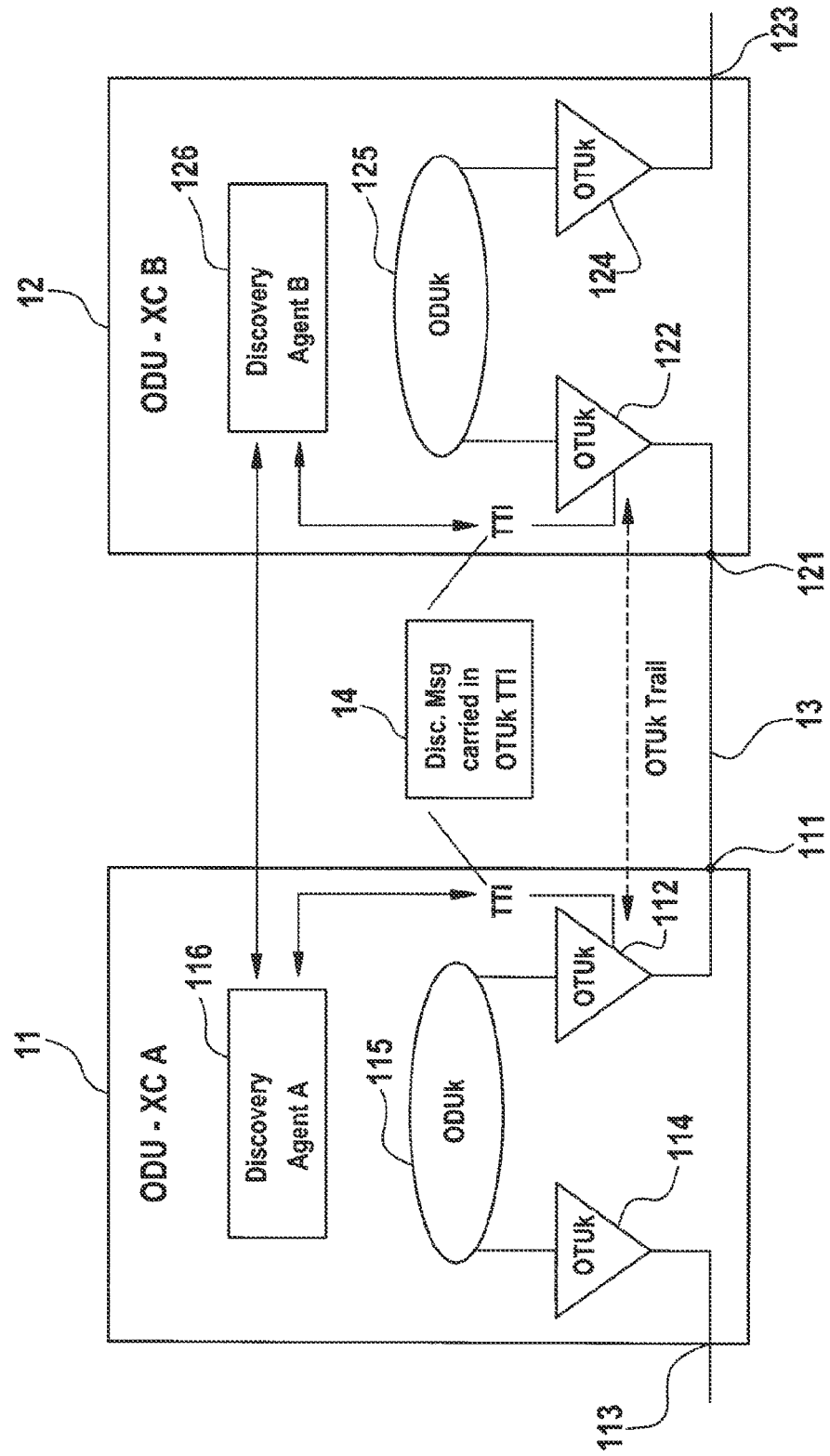
FIG. 1 shows an example of layer adjacency discovery using the currently defined OTUk TTI.

Looking at the OTN, the OTU layer is the layer that corresponds to the section layers (MS/RS) in SONET/SDH. The OTN as defined in G.709, comprises digital (electrical) as well as photonic layers. The OTU layer is the lowest digital (electrical) layer in the OTN hierarchy and "provides for the transport of ODU client signals through an OTU trail between 3R points of the OTN". If two OTN cross-connects are interconnected via a (single-hop) OTU trail as depicted in FIG. 1, in-service OTU-TTI based LAD can be applied and the corresponding OTU Connection Points (CPs) can be inferred as defined in G.7714.1.

A basic network element in a transport network is referred to as a cross-connect, which provides electrical and/or optical switching operations to establish interconnections through the network. FIG. 1 shows a first OTN cross-connect 11 connected over a bidirectional optical link 13 to a second OTN cross-connect 12. Cross-connect 11 has a first interface 111 with an associated OTUk termination function 112 and a second interface 113 and associated OTUk termination function 114. A switch matrix 115 interconnects interfaces 111, 112 at ODUk layer. A discovery agent 116, which runs on a controller of the OTN cross-connect 11, configures OTUk termination function 112 to insert appropriate discovery messages 14 into the TTI field of the OTUk overhead and analyses discovery messages 14 received in reverse direction in the TTI field from OTN cross-connect 12. Equally, OTN cross-connect 12 has interfaces 122, 123, associated OTUk termination functions, a switch matrix 125 interconnecting the interfaces 122, 124 at ODU layer, as well as a discovery agent 126, which controls OTU termination functions 122, 124.

Alternatively, the higher order (HO) ODU CPs can also be inferred because of the fixed 1:1 relationship between the OTU CP and the HO ODU CP as there is matrix or switching function between the OTU and the HO ODU layer.

Figure 2:
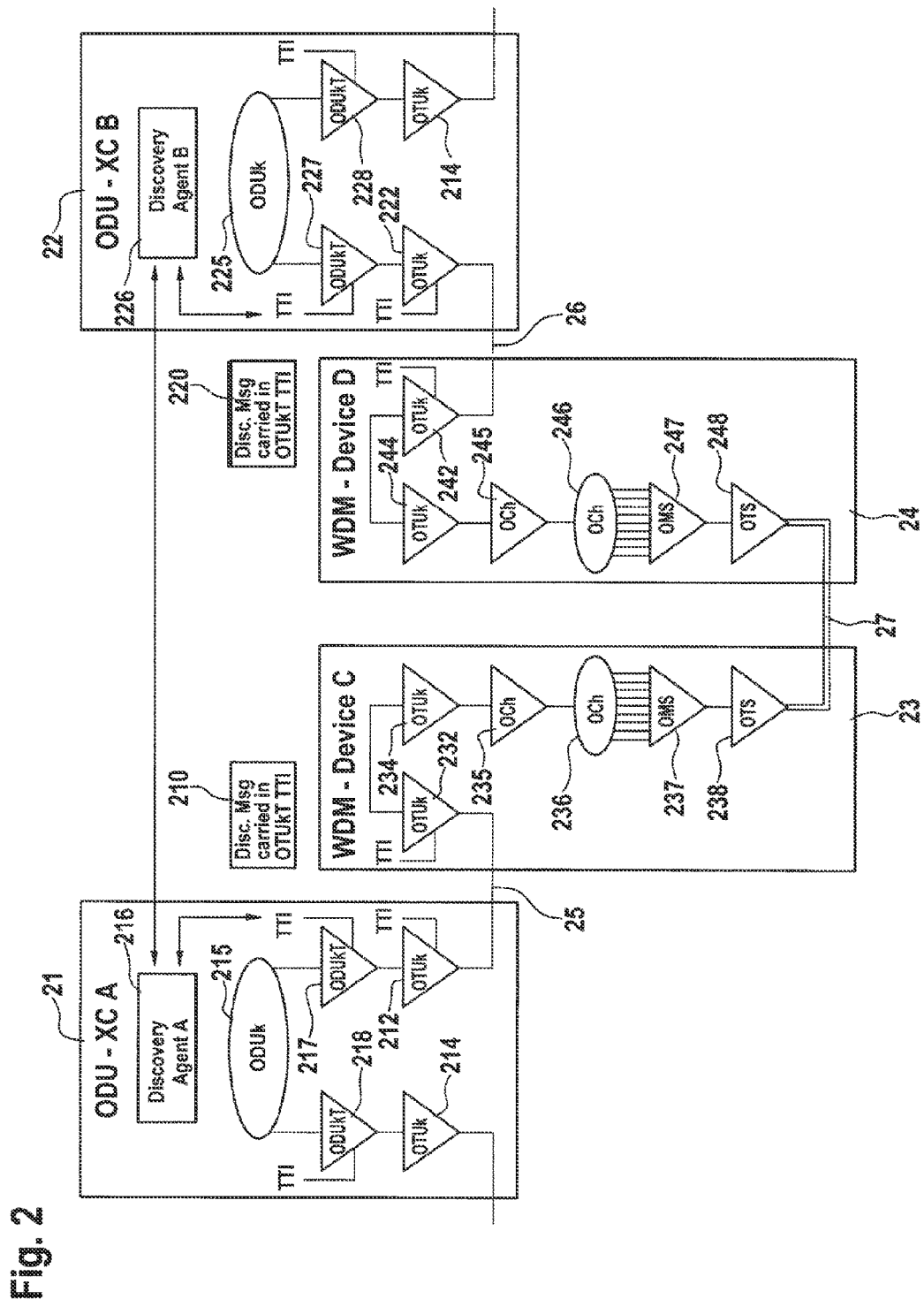
FIG. 2 shows layer adjacency discovery making use of a TCM sublayer between two optical cross-connects interconnected over intermediate WDM equipment.

In today's OTNs, the photonic functions are typically decoupled from the electrical functions and the related functions are located in different types of equipment. This means that an OTN is typically composed of OTN cross-connects that mainly provide electrical switching functions for the various ODU layers and WDM equipment that mainly provides the photonic transmission and switching functions such as transponders, wavelength multiplexers/de-multiplexers and wavelength selective switches and may in addition have an electrical HO ODU switching function. Based on this functional split, an OTN cross-connect is typically interconnected with its peers over WDM links or a WDM network and the interconnection between the OTN cross-connect and the adjacent WDM device is realized via an OTU trail. This means that even in the simplest case where only two WDM devices interconnect two OTN cross-connects over a single WDM link, three OTU trails have to be crossed: one between the OTN cross-connect (OXC) and the transponder in the near end WDM device, one between the two transponders in the two WDM devices, and another one between the transponder in the far end WDM device and the far end OXC. This situation is schematically depicted in FIG. 2.

That situation has some implications for link adjacency discovery (LAD) in an OTN. Due to the termination of the OTU layer in the WDM equipment, the two OTN cross-connects cannot use the OTU layer for LAD and would have to go to the next higher layer in the OTN hierarchy, i.e., the higher order (HO) ODU layer.

However, only if the HO ODU layer is terminated at the two adjacent ODU-cross-connects, i.e. the HO ODU layer is only used as multiplexing layer for LO ODU connections between two adjacent OTN cross-connects, the TTI-based LAD can be applied at the HO ODU layer. In other cases, when for example the HO ODU layer is not terminated, in-service TTI-based LAD cannot be applied. This means that HO ODU layer TTI-based LAD can be applied in some situations and must not be applied in some other situations. Hence, a solution would be desirable that can always be applied.

In the discussion below, a solution based on the HO ODU Tandem Connection Monitoring (TCM) function is described that solves the LAD issues described above.

FIG. 2 illustrates a scenario where two OTN cross-connects (OXCs) 21, 22 are interconnected via a WDM network. OXC 21 has two interfaces for optical transport signals. Each interfaces has a OTUk termination function 212, 214 and a termination function ODUkT 217, 218 for terminating a tandem connection layer in the ODUk overhead. A switch matrix 215 interconnects the interfaces at ODUk level. A discovery agent 216 configures the ODUkT termination function. Equally, OXC 22 had interfaces with OTUk termination function 222, 224 and ODUkT termination function 227, 228, and switch matrix 225 interconnecting the interfaces at ODUk level and a discovery agent 226 configuring the ODUkT termination functions.

In terms of hardware, the termination functions are typically performed by an overhead processor available on the line card of the OXC. Alternatively, overhead termination functions could be implemented on a common overhead server, which is interconnected with the various line cards via the switching matrix or via a dedicated bus architecture. The discovery agent would typically be a software implemented process running on a controller of the respective network node, but can also be implemented as a dedicated controller. While only two interfaces are shown in the figures, it should be clear that real network nodes have a large number of these interfaces. The switch matrix would typically perform a space and time switching function.

OXC 21 is connected over an optical link 25 to a first WDM node 23. Over WDM link 27, WDM node 23 is connected to WDM node 24, which in turn is connected via an optical link 26 to OXC 22.

WDM node 23 has at its input an OTUk termination function 232 for the signal received from OXC 21 and at its output towards WDM node 24 a series of termination functions, in particular, an OTUk termination function 234, an Optical Channel (OCh) termination function 235, an OCh connection function 236, an Optical Multiplex Section (OMS) termination function 237 and an Optical Transmission Section (OTS) termination function. The same termination functions 242-248 are present in WDM node 24, as well. These functions are known as such and are defined and explained in detail in G.709, so that no further discussion is necessary here.

Figure 3:
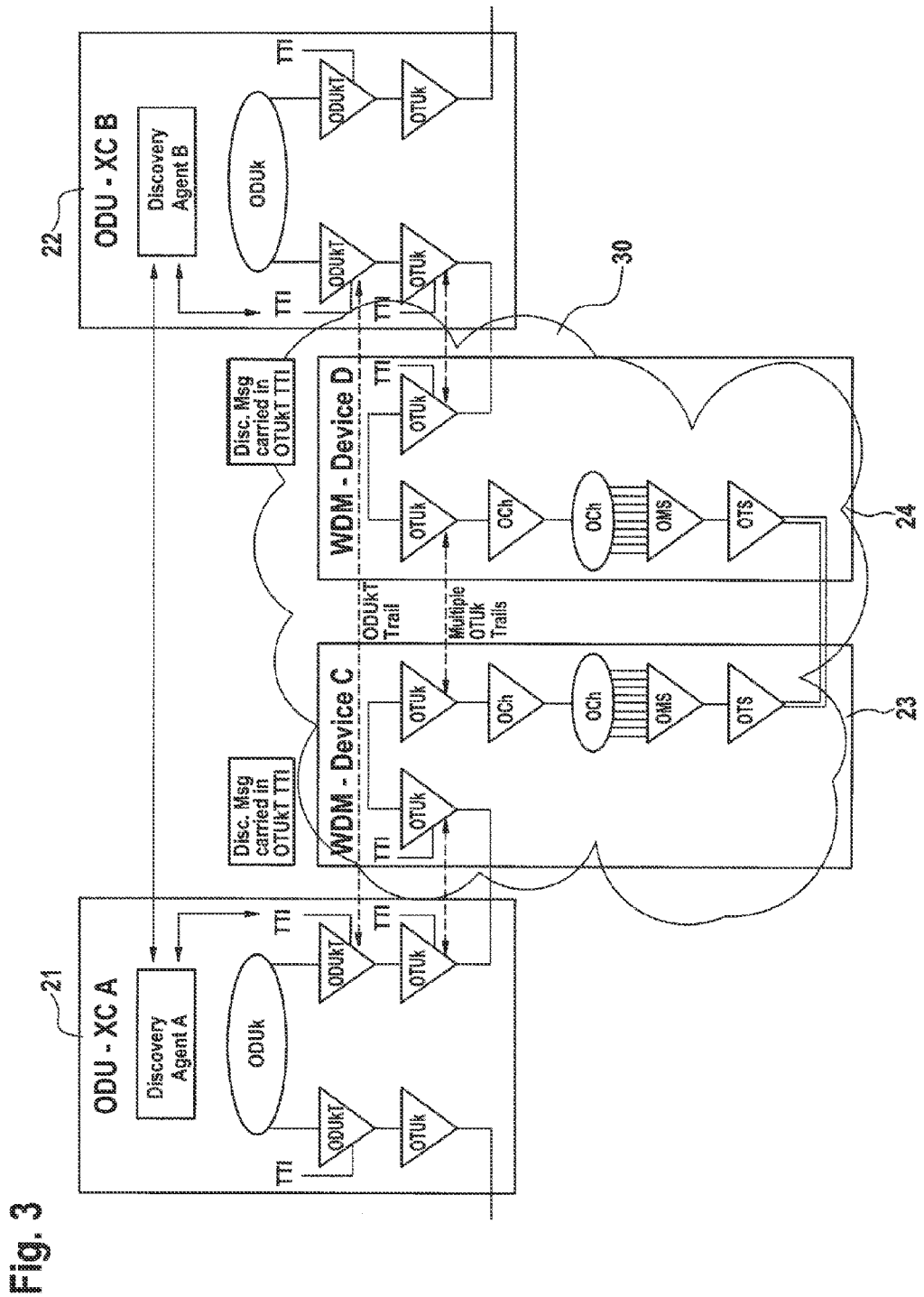
FIG. 3 shows an abstraction of FIG. 2.

The critical aspect however is that WMD nodes 23, 24 terminate the received signal up to the OTUk layer and only pass the HO ODU signal transparently to the transponder 235, 245 that generates the OCH and subsequent optical signals with a particular wavelength. In some cases the optical signal may need to be regenerated and in such case 3R-regenerators could also terminate the OTUk signal at some intermediate points. As a result, multiple OTU trails could be stitched together and the HO ODUk link connection is the first entity in the OTN layer network that exists between the two OXCs 21, 22. FIG. 3 therefore shows an abstraction of FIG. 2 in the sense that WDM nodes 23, 24 just act as edge nodes of a more complex WDM subnetwork 30, where the connection between OXC 21 and OXC 22 can lead over multiple OTUk trails. The consequence is that the OTUk layer is not available for the link adjacency discovery (LAD) between OXC 21 and OXC 22.

The other option as specified in G.7714.1 is to perform LAD at the ODUk layer network and to use the ODUk TTI for carrying the discovery message. As already discussed above, the HO ODU trail termination function may not be present for example as shown in FIGS. 2 and 3, since ODUk needs to be connected in OXC 21 and OXC 22 transparently. In particular, the HO ODU signal represents the service layer and the ODUk CP is connected to another ODUk CP on a different port of the same OXC. Hence, the ODUk layer TTI cannot be used for LAD.

Therefore, as shown in FIGS. 2 and 3, it is proposed to add Tandem Connection Monitoring (TCM) Source and Sink functions 217, 227 in network nodes 21, 22.

G.709 defines six TCM sub-layers that may exist underneath the HO ODUk layer network. The proposal is now to establish a tandem connection, using one out of the six TCM sub-layers, and to use the TTI field of the TCM function for LAD as defined in G.7714.1. The TCM termination functions ODUkT 217, 227 provide a means for carrying the discovery message 210, 220 transparently across the WDM network such that these discovery messages 210, 220 can be exchanged between the two OXCs. This solution has the additional advantage that the tandem connection is available to supervise the integrity of the HO ODU link connection and raise alarms that can be used as triggers for consequent actions such as restoration.

The proposed HO ODUkT TTI-based LAD allows to discover the HO ODU CPs while the ODUk signal including its own TTI is in-service. This method can also be applied when the HO ODU signal is terminated and carries LO ODU signals that are interconnected or can be terminated in the OXC.

Figure 4:
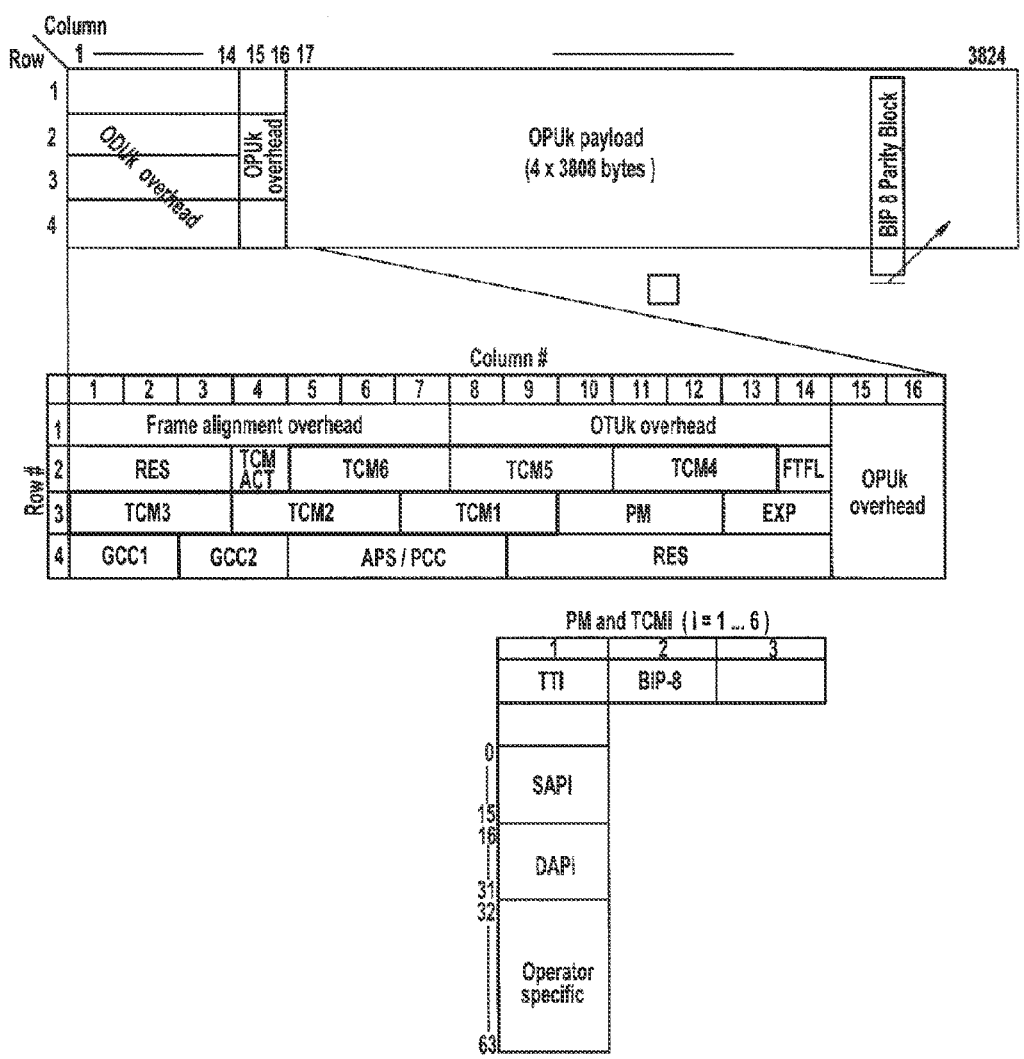
FIG. 4 shows the frame structure used in OTN.

FIG. 4 as taken from G.709 show the frame structure of transport signals in OTN. The shown frame contains 3824 columns by 4 rows. The transmission of the frame is row by row from left to right. Columns 1 to 16 contain overhead. Row 1 carries in bytes 1 to 7 the frame alignment word and from byte 8 to 14 the OTUk overhead. In the OTUk overhead, bytes 8, 9 and 10 are available for section monitoring (SM), where byte 8 is the TTI field of the OTUk.

Rows 2 to 4 contain the ODUk overhead, where bytes 10, 11, and 12 in row 3 are available for path monitoring (PM). Again, byte 10 in row 3 is the TTI field of the ODUk.

The one byte TTI carries a 64 byte superframe, i.e. the TTI bytes of 64 subsequent frames form the full TTI field, where the individual bytes are numbered from 0 to 63. In this 64 bytes TTI superframe, bytes 0 to 15 are reserved for a Source Access Point Identifier SAPI, bytes 16 to 31 are reserved for a Destination Access Point Identifier DAPI and bytes 32 to 63 are available for operator specific purpose. The BIP-8 in the field after the TTI is a byte-interleaved parity of the previous frame and serves for error detection purpose.

Instead of the SM or PM field in the OTUk or ODUk overhead, respectively, it is proposed to use one of the TCM fields. Six sublayers of TCM fields are available upon configuration and activation between a TCM source and a TCM sink along a path represented by the ODUk. The six TCM fields TCM1-TCM6 are marked with bold lines here and have the same structure and definition as the PM field. Therefore, it is proposed to use the TTI field in one of these six TCM fields, in particular the SAPI field thereof, for the Link Adjacency Discovery (LAD) as defined in G.7714.1.

Since the TCM function needs to be configured between TCM source and sink, one option would be to pre-configure one of the TCM sub-layers as the default TCM for LAD. For example OXC 21 would use then the TTI of the default TCM sub-layer for exchanging the LAD messages defined in G7714.1 and OXC 22 would monitor that default sub-layer for LAD messages.

However, there may also be the situation that this pre-configured sublayer is already in use on the particular ODUk path by a preceding node and hence cannot be interrupted with the LAD. It would therefore be advantageous, to monitor in OXC 21 the intended TCM sub-layer first using a non-intrusive TCM monitor and use it only when it shows to be unused. Such technique is described in more detail in EP 1372288, which is incorporated by reference herein. OXC 22 would then monitor or "scan" all TCM sub-layers for the LAD messages. A default sequence could be defined, in which order the TCM sublayers shall be tried.

The TTI provides a mechanism to pass a message that is 16 bytes in length. Each trace byte consists of a message start bit, and 7-bits for "payload". The message start bit is set for the first byte in the message, and clear for all remaining bytes in the message.

The following Attributes will be used in the LAD according to G.7714.1:

Distinguishing Character
This character "+" is used as the distinguishing character, and its purpose is to avoid the format of OTN trail-trace string being confused with some other optional format.

Discovery Agent (DA) Identifier (ID)
The DA ID must be unique within the context of the link being discovered. Two different representations of the DA ID exist: a DA Address and a DA Name.

Discovery Agent Address
Two attributes are defined to support the DA Address:
DCN (Data Communication Network) Context ID
This represents an assigned number (a globally assigned number would be desirable). This attribute may be used in conjunction with the DCN Address attribute to guarantee uniqueness for the DA ID. If the sending and receiving Discovery Agents at each end of the link are within different DCN Contexts, but use the same DCN Addresses, they may be unable to communicate.
DA DCN Address
This represents the address used to identify the Discovery Agent.

Discovery Agent Name
This is a name that can be resolved into a DA Address.
TCP-ID
The TCP-ID contains the identifier for the TCP (Termination Connection Point) being discovered. This has only local significance within the scope of the DA.

During the LAD, the initiating discovery agent sends to the responding discovery agent its discovery agent ID and a TCP-ID. This information can be contained directly in the message or can be derived from the message by an external process such as a name-server. Discovery messages can contain a TCP Name, which can be uniquely resolved through a name server into the Discovery Agent Data Communication Network (DCN) Address and TCP-ID. It can also contain a DA DCN Address with the actual Discovery Agent ID and TCP-ID values. The Discovery Agent ID consists of a DCN Context ID as well as the DCN Address of the sending Discovery Agent. The remainder of the message contains an TCP-ID, which has local significance to the Discovery Agent transmitting the Discovery Message. In a third variant, the discovery messages can carry a DA DCN Name, which contains the Discovery Agent ID and the TCP-ID value. However, unlike the DCN Address format, the Discovery Agent ID is in the form of a DCN Name. Consequently, a name-server must be used to translate the DCN Name into the DCN Address of the Discovery Agent.

The procedure for Layer Adjacency Discovery is as follows:
1. The initiating Discovery Agent transmits the discovery message with the appropriate attributes.
2. Upon receiving a discovery message, the responding DA checks to determine the applicability of the message using the distinguishing character to validate the discovery message.

3. After determining that the received message is a discovery message, the responding Discovery Agent then determines whether the values received are unique with respect to already discovered neighbours.
   3.1. If the Format ID=1, a name-server is needed to determine the DA DCN address and TCP-ID.
   3.2. If the Format ID=2, then no further address translation is needed.
   3.3. If the Format ID=3, then address translation is needed for the DA DCN name.
4. Generate a discovery response message.

The response message can be transmitted for instance using a control plane protocol through the control plane to the DA address provided in the discovery message. It can alternatively be transmitted in reverse direction using the same TCM TTI field.

When the Discovery Agent receives the discovery message for the first time, it may notify the originating Discovery Agent that the message was received on a trail termination associated with a particular TCP. This TCP, called the Discovery Sync TCP, is identified in the response using the discovery information currently being sent on the TCP. Additional optional attributes may be included as a part of an implementation as defined by G.7714.1.

Once a Discovery Message has been received on a resource and a Discovery Response Message describing the same resource is received over the DCN, it is possible to correlate the messages and determine if a bidirectional link exists. If the TCP-ID corresponding to the remote endpoint of the link connection is not the same in both messages, then a miswired condition exists. If the TCP-ID is the same then the Transmit/Receive signal pair have been properly wired. This is described in greater detail in Appendix II of G.7714.1.

Once a bidirectional link has been discovered, it should be checked against management-provided policy to determine if correct TCP-link connection endpoints have been correctly connected. If the policy states that the TCP-link connection endpoints may not be paired to form a link, then a misconnection condition exists.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for supporting automatic Layer Adjacency Discovery in an Optical Transport Network between a first network node having a first discovery agent and a second network node having a second discovery agent;
   the method comprising transmitting a Layer Adjacency Discovery message from a first interface of the first network node over one or more subsequent network links of said Optical Transport Network to a second interface of the second network node,
   said Layer Adjacency Discovery message comprising information indicative of a discovery agent identifier associated with the first discovery agent and of a termination connection point identifier associated with the first interface connection point identifier associated with the first interface;
   said method further comprising:
   by said first discovery agent, generating said Layer Adjacency Discovery Message,
   by said first interface, inserting said Layer Adjacency Discovery Message into a Trail Trace Identifier Field of one of six Tandem Connection Monitoring fields of an Optical Data Unit-k (ODU) overhead,
   by said first interface, transmitting said Layer Adjacency Discovery Message by transmitting said Optical Data Unit-k (ODU) overhead,
   by said second interface, receiving said Optical Data Unit-k (ODU) overhead,
   by said second interface, monitoring said Trail Trace Identifier Field of said one of said six Tandem Connection Monitoring fields of said Optical Data Unit-k (ODU) overhead for said Layer Adjacency Discovery Message,
   by said second interface, providing said monitored Layer Adjacency Discovery Message to said second discovery agent.

2. The method according to claim 1,
   wherein said Trail Trace Identifier Field is a Source Access Point Identifier (SAPI) field.

3. The method according to claim 1, wherein said first interface
   inserts said Layer Adjacency Discovery Message into a Trail Trace Identifier Field of a default one of said six Tandem Connection Monitoring fields of said Optical Data Unit-k (ODU) overhead.

4. The method according to claim 1, wherein said first interface monitors said Trace Trail Identifier field of said Tandem Connection Monitoring Field prior to inserting said Link Adjacency Discovery Message and inserts said Link Adjacency Discovery Message only in case said Trace Trail Identifier field shows to be unused.

5. The method according to claim 1, wherein said second interface monitors a Trail Trace Identifier Field of a default one of said six Tandem Connection Monitoring fields of said Optical Data Unit-k (ODU) overhead for said Layer Adjacency Discovery Message.

6. The method according to claim 1, wherein said second interface monitors all six Trace Trail Identifier fields of said six Tandem Connection Monitoring fields provided in said Optical Data Unit-k (ODU) overhead for the presence of said Layer Adjacency Discovery message.

7. A first network node for performing the method steps of the first network node of a method according to claim 1 comprising at least one processor configured to provide a discovery agent for supporting automatic Layer Adjacency Discovery in an Optical Transport Network between the first network node and a second network node configured to generate a Layer Adjacency Discovery Message comprising information indicative of a discovery agent identifier associated with the discovery agent and of a termination connection point identifier associated with an interface connection point identifier associated with an interface of the first network node; and the interface configured to insert the Layer Adjacency Discovery Message into a Trail Trace Identifier Field of one of six Tandem Connection Monitoring fields of an Optical Data Unit-k (ODU) overhead and to transmit the Optical Data Unit-k (ODU) overhead over one or more subsequent network links of the Optical Transport Network to an interface of the second network node.

8. The first network node according to claim 7, wherein the at least one processor is further configured to provide a further interface configured to receive from the second network node of the Optical Transport Network a further Optical Data Unit-k (ODU) overhead having inserted into a Trail Trace Identifier Field of one of six Tandem Connection Monitoring fields of the further Optical Data Unit-k (ODU) overhead a further Layer Adjacency Discovery Message comprising information indicative of a discovery agent identifier associated with a discovery agent of the second network node and of a termination connection point identifier associated with an interface connection point identifier associated with a further interface of the second network node, to monitor the Trail Trace Identifier Field and to provide the monitored further Layer Adjacency Discovery Message to a further discovery agent of the first network node, and the further discovery agent configured to support the automatic Layer Adjacency Discovery in the Optical Transport Network using the monitored further Layer Adjacency Discovery Message.

9. The first network node according to claim 7, wherein said Trail Trace Identifier Field is a Source Access Point Identifier (SAPI) field.

10. A second network node for performing the method steps of the second network node of a method according to claim 1 comprising at least one processor configured to provide an interface configured to receive from an interface of a first network node over one or more subsequent network links of an Optical Transport Network an Optical Data Unit-k (ODU) overhead having inserted into a Trail Trace Identifier Field of one of six Tandem Connection Monitoring fields of the Optical Data Unit-k (ODU) overhead a Layer Adjacency Discovery Message comprising information indicative of a discovery agent identifier associated with a discovery agent of the first network node and of a termination connection point identifier associated with an interface connection point identifier associated with the interface of the first network node, to monitor the Trail Trace Identifier Field and to provide the monitored Layer Adjacency Discovery Message to a discovery agent, and the discovery agent configured to support the automatic Layer Adjacency Discovery in the Optical Transport Network using the monitored Layer Adjacency Discovery Message.

11. The second network node according to claim 9, wherein the at least one processor is further configured to provide a further discovery agent for supporting automatic Layer Adjacency Discovery in the Optical Transport Network between the second network node and the first network node configured to generate a further Layer Adjacency Discovery Message comprising information indicative of a discovery agent identifier associated with the further discovery agent and of a termination connection point identifier associated with an interface connection point identifier associated with a further interface of the second network node; and the further interface configured to insert the further Layer Adjacency Discovery Message into a Trail Trace Identifier Field of one of six Tandem Connection Monitoring fields of a further Optical Data Unit-k (ODU) overhead and to transmit the further Optical Data Unit-k (ODU) overhead to a further interface of the first network node.

12. The second network node according to claim 10, wherein said Trail Trace Identifier Field is a Source Access Point Identifier (SAPI) field.

13. A non-transitory digital storage medium encoding a machine executable program of instructions to perform method steps of a first network node of a method according to claim 1 for supporting Layer Adjacency Discovery in an Optical Transport Network, the method comprising the steps of:

generating by a discovery agent of the first network node a Layer Adjacency Discovery Message comprising information indicative of a discovery agent identifier associated with the discovery agent and of a termination connection point identifier associated with an interface connection point identifier associated with an interface of the first network node, inserting by the interface the Layer Adjacency Discovery Message into a Trail Trace Identifier Field of one of six Tandem Connection Monitoring fields of an Optical Data Unit-k (ODU) overhead, and transmitting by the interface the Optical Data Unit-k (ODU) overhead over one or more subsequent network links of the Optical Transport Network to an interface of the second network node.

14. The Non-transitory digital storage medium according to claim 13, wherein the method further comprising the steps of:

receiving by a further interface of the first network node from a further interface of the second network node a further Optical Data Unit-k (ODU) overhead having inserted into a Trail Trace Identifier Field of one of six Tandem Connection Monitoring fields of the Optical Data Unit-k (ODU) overhead a further Layer Adjacency Discovery Message comprising information indicative of a discovery agent identifier associated with a further discovery agent of the first network node and of a termination connection point identifier associated with an interface connection point identifier associated with the further interface of the second network node, monitoring by the further interface of the first network node the Trail Trace Identifier Field, and providing by the further interface of the first network node the monitored further Layer Adjacency Discovery Message to a further discovery agent of the first network node.

15. The Non-transitory digital storage medium according to claim 13, wherein said Trail Trace Identifier Field is a Source Access Point Identifier (SAPI) field.

16. A non-transitory digital storage medium encoding a machine executable program of instructions to perform method steps of a second network node of a method according to claim 1 for supporting Layer Adjacency Discovery in an Optical Transport Network, the method comprising the steps of:

receiving by an interface of the second network node from an interface of a first network node over one or more subsequent network links of the Optical Transport Network an Optical Data Unit-k (ODU) overhead having inserted into a Trail Trace Identifier Field of one of six Tandem Connection Monitoring fields of the Optical Data Unit-k (ODU) overhead a Layer Adjacency Discovery Message comprising information indicative of a discovery agent identifier associated with a discovery agent of the first network node and of a termination connection point identifier associated with an interface connection point identifier associated with the interface of the first network node, monitoring by the interface of the second network node the Trail Trace Identifier Field, and providing by the interface of the second network node the monitored Layer Adjacency Discovery Message to a discovery agent of the second network node.

17. The Non-transitory digital storage medium according to claim 16, wherein the method further comprising the steps of:

generating by a further discovery agent of the second network node a further Layer Adjacency Discovery Message comprising information indicative of a discovery agent identifier associated with the further discovery agent and of a termination connection point identifier associated with an interface connection point identifier associated with a further interface of the second network node, inserting by the further interface the further Layer Adjacency Discovery Message into a Trail Trace Identifier Field of one of six Tandem Connection Monitoring fields of a further Optical Data Unit-k (ODU) overhead, and transmitting by the further interface the further Optical Data Unit-k (ODU) overhead to a further interface of the first network node.

18. The Non-transitory digital storage medium according to claim 16, wherein said Trail Trace Identifier Field is a Source Access Point Identifier (SAPI) field.

19. An Optical Transport Network equipment for supporting automatic Layer Adjacency Discovery comprising a first network node having a first discovery agent and a second network node having a second discovery agent;

the first network node comprising at least one processor configured to generate by said first discovery agent a Layer Adjacency Discovery Message comprising information indicative of a discovery agent identifier associated with the first discovery agent and of a termination connection point identifier associated with an first interface connection point identifier associated with a first interface of the first network node, insert by said first interface said Layer Adjacency Discovery Message into a Trail Trace Identifier Field of one of six Tandem Connection Monitoring fields of an Optical Data Unit-k (ODU) overhead, and transmit from said first interface said Layer Adjacency Discovery message by transmitting said Optical Data Unit-k (ODU) overhead over one or more subsequent network links of said Optical Transport Network to a second interface of the second network node, second network node comprising at least one processor configured to receive by said second interface said Optical Data Unit-k (ODU) overhead, monitor by said second interface said Trail Trace Identifier Field of said one of said six Tandem Connection Monitoring fields of said Optical Data Unit-k (ODU) overhead for said Layer Adjacency Discovery Message, and provide by said second interface, said monitored Layer Adjacency Discovery Message to said second discovery agent.

* * * * *